United States Patent Office 3,005,733
Patented Oct. 24, 1961

3,005,733
TREATMENT OF PERMEABLE PLASTER ARTICLES TO AVOID CORROSION THEREOF
Andrew R. Blackburn, Westerville, and Richard E. Steele, Columbus, Ohio, assignors to Ram Incorporated, Columbus, Ohio, a corporation of Michigan
No Drawing. Filed Sept. 29, 1958, Ser. No. 763,807
7 Claims. (Cl. 134—22)

This invention relates to treatment or processing of permeable plaster articles such as, for example, plaster molds used in the production of shaped wares from plastic materials. More particularly the invention involves a method of avoiding corrosion of permeable plaster articles which are, in use, exposed or subjected to contact with water.

The invention as hereinafter described finds especial application in connection with shaped ware production from plastic materials such as plastic clay wherein molds of permeable plaster are employed to press the clay into the configuration of the mold cavity. In the use and handling to which these permeable plaster molds are subjected it has been found that undesired corroding of the surfaces of the die members making up the mold cavity occurs resulting in reduced useable life for the mold.

For a better appreciation of the shaped ware production procedures employing such permeable plaster molds, reference may be had to Blackburn et al. Patent 2,584,109 which describes, what is termed in the art as the "fluid release process." By this process the conventional plastic pressing method for forming ceramic ware may be practiced on a mass production basis. In this process perforated conduits are positioned within the permeable plaster die members for applying fluid under pressure through the contoured ware-forming surfaces of the die members. Pursuant to the fluid release process, the die members are closed with a batt or mass of moist plastic material therebetween to shape the material into the ware and thereby force moisture from the material into the die members. Thereafter, a fluid under pressure, such as compressed air, is passed into the perforated conduits and then outwardly through the contoured ware-forming surfaces of the die members to release the ware therefrom. The moisture of water forced into the ware-forming surfaces of the die members from the batt or mass may consist of water used to temper the clay mass being fed to the press performing the ware production operation.

Frequently these molds are used for a period and then set aside where they naturally tend to dry out. When it is desired to re-use these molds or where dried new molds are to be employed, they are conditioned for use on the ware production press by being soaked in water to saturate the mold. Water saturation of the mold is important from a functional standpoint, with respect to the physical characteristics of the strength of the mold, and is of particular importance in facilitating the release of the ware from the mold. Actually a dry mold is very brittle and readily breaks if it is used dry. Thus wetting the mold gives it some degree of resiliency.

Another instance where the ware pressing permeable plaster molds come in contact with liquid occurs where the pores of the mold plaster have to be cleaned or flushed to remove foreign matter deposited in the mold pores by materials to which the ware-forming surfaces are exposed in ware production. When the mold pores become clogged or restricted by such foreign matter, the general practice has been to rejuvenate the ware-forming surfaces of the mold by flowing water freely over the surfaces or by forcing water through the pores of the permeable plaster as by utilizing the perforated conduits imbedded in the die members to distribute the water for effective flushing of the pores.

The art has recognized the desirability of prolonging the life of the plaster die members employed, especially in the fluid release process, provided the performance of the die members in repeatedly shaping and releasing ware be not adversely affected. Several instances have been noted hereinabove where the permeable plaster molds are repeatedly subjected or exposed to contact with water. Thus, in use on the press, repeated alternated passage of water through the pores of the ware-forming surfaces of the die members occurs; in conditioning of the molds for use after they have dried out during a period of non-use they are soaked in water; and in cleaning or flushing of the ware-forming surfaces water is used.

It has been determined that apparently these repeated contacts or exposure to water, particularly in the presence of air, has a deleterious effect on the ware-forming surfaces of the molds by unduly hastening the loss of the desired contour of the surfaces and generally deteriorating the mold. In fact, the presence of carbon dioxide, as is contained in air, increases the rate of deterioration of the mold when contacted with water in the presence of air.

With respect to increased mold deterioration when contacted with water in the presence of air, it may be pointed out that the great majority of these molds are made of gypsum cement. This gypsum cement includes gypsum plaster with additives which affect the expansion, hardness, consistency of the mix, etc. These gypsum cements are highly alkaline as compared with plaster of Paris. Thus the rate of mold deterioration when contacted with water in the presence of carbon dioxide is greater with respect to molds of gypsum cement. Considering this fact, the problem of gypsum cement mold deterioration on contact with air and water is a serious drawback to long mold life.

It is accordingly an object of this invention to provide a method for prolonging the useful life of permeable plaster articles, such as ware-forming molds used in shaped ware production that are exposed or subjected to water which has a corrosive effect on the plaster material.

It is another object of this invention to provide a method of water saturating plaster articles whereby the useful life of the plaster article is significantly prolonged.

It is still a further object of this invention to provide an economical method for prolonging the life of plaster articles which are repeatedly subjected to the corrosive action of water.

In a broader aspect, this invention consists of saturating water with calcium sulfate prior to contacting the water with the plaster article. In referring to plaster articles it will be understood that such term includes articles made of gypsum cement, plaster of Paris or other plaster materials.

It has been found that by saturating water with calcium sulfate the corrosive action of water on plaster molds can be inhibited. Although this corrosive action is very slight over short periods of time when a plaster mold is subjected to the prolonged action of water, the mold deteriorates and the surface of the mold loses its initial contour. This effect is, of course, most pronounced and detrimental when the contour of the mold has more sharply defined characteristics. Further, in the presence of air this mold deterioration is hastened by the carbon dioxide present in the air.

The corrosive character of the water on the permeable plaster article such as a ware pressing mold is presumably due to the solubility of plaster or calcium sulfate in water. Although the solubility of calcium sulfate in water is very slight, over prolonged periods and repeated exposure to water appreciable amounts of the plaster are dissolved and the mold deteriorates. Additionally, this deterioration, even over relatively short periods of exposure to water, is speeded up in the presence of carbon dioxide such as present in air. By using water solutions containing calcium sulfate it has been found that the corrosive action of the water is substantially reduced.

Saturation of water with calcium sulfate can be accomplished by allowing the water to remain in contact with particulate calcium sulfate, such as in the form of gypsum cement, in tanks for short periods of time before use. Alternatively, if a continuous water feed is desired, calcium sulfate traps may be used whereby the water is fed through packed columns or traps containing finely divided calcium sulfate such as in the form of gypsum cement. The water flow through such a column or trap will be dependent upon the mesh of the particles used and the length and diameter of the column in which the calcium sulfate is packed. In accordance with the instant invention the end product at the outlet from such a column or trap must have adequate saturation of the water so that the resulting solution has very little, if any, corrosive effect on the plaster article. One effective approach to saturating the water to be used in treating the mold is to bring the water in contact with particulate gypsum cement of the same type as that used in making the particular mold which is to be treated with the saturated water.

As a further facet of the instant invention, it has been found that saturation of the water with calcium sulfate is expedited in the presence of carbon dioxide. Accordingly, in accordance with this invention, the water may be more effectively saturated with calcium sulfate where carbon dioxide gas is present in the column or trap, or by dissolving even minor amounts of carbon dioxide in the water employed.

Referring back to the various instances mentioned wherein permeable plaster ware-forming molds are subjected or exposed to water, it will be appreciated from the description of the invention that the molds in use and handling in accordance with this invention will only be subjected to calcium sulfate saturated water. This calcium sulfate saturated water will be used, for example, in conditioning the molds after periods of nonuse and drying out. In such case the molds to be conditioned may be either soaked in the calcium saturated liquid or even be subjected to such liquid under pressure applied through the perforated conduits imbedded in the mold which are generally used for the release air in the "fluid release process." Similarly, in cleaning or flushing the ware-forming surfaces to rejuvenate them and clear the pores of foreign matter, the calcium sulfate saturated liquid will be used. In these instances it has been found that deterioration of the contour of the ware-forming surfaces and general degradation of the molds is materially retarded resulting in increased mold life.

It will be appreciated that the scope of this invention is not limited to the ware production art, although it is of particular importance in that field. The invention is broadly applicable to the use of water is contact with plaster articles. Further applications may be in connection with fire-resistant wall structures and safes wherein a permeable plaster lining is employed as an insulation material with water being conducted to the lining in the manner disclosed in Blackburn et al. Patent No. 2,669,762. It will be recognized that in such applications the water, when it is conducted to the permeable plaster wall structure or safe lining, will be saturated with calcium sulfate as by passing through a column or trap containing particulate calcium sulfate such as in the form of gypsum cement as heretofore mentioned. By use of the instant invention in these applications the fire resisting period for the wall structure or safe lining will be materially increased since corroding of the permeable plaster pores and possible channeling of the water flow within the plaster will be substantially decreased.

Having thus described our invention, we claim:

1. A method for treating a permeable plaster article such as ware-forming molds and preventing corrosion of the pores and surface of the permeable plaster article during such treating comprising dissolving calcium sulfate in water to be brought into contact with the permeable plaster article to saturate such water with calcium sulfate, and applying the calcium sulfate saturated water to the permeable plaster article in the treatment of the permeable plaster article.

2. A method for treating a permeable plaster article such as ware-forming molds and preventing corrosion of the pores and surface of the permeable plaster article during such treating comprising providing a quantity of particulate calcium sulfate, passing water to be brought into contact with the permeable plaster article through said quantity of particulate calcium sulfate to saturate the water with calcium sulfate, and applying the calcium sulfate saturated water to the permeable plaster article in the treatment of the permeable plaster article.

3. A method for treating a permeable plaster article such as ware-forming molds and preventing corrosion of the pores and surface of the permeable plaster article during such treating comprising providing a quantity of particulate calcium sulfate in the presence of carbon dioxide, passing water to be brought into contact with the permeable plaster article through said quantity of particulate calcium sulfate in the presence of carbon dioxide to saturate the water with calcium sulfate, and applying the calcium sulfate saturated water to the permeable plaster article in the treatment of the permeable plaster article.

4. A method for flushing the pores of the ware-forming surfaces of a permeable plaster mold and preventing corrosion of the permeable plaster mold during such flushing comprising dissolving calcium sulfate in water to be forced through the pores of the ware-forming surfaces of the mold to saturate such water with calcium sulfate, and applying the calcium sulfate saturated water under pressure to the interior of the permeable plaster mold to force such water through the pores of said mold and flush the pores of foreign matter lodged therein.

5. A method for flushing the pores of the ware-forming surfaces of a permeable plaster mold and preventing corrosion of the permeable plaster mold during such flushing comprising dissolving calcium sulfate in water in the presence of carbon dioxide to saturate such water with calcium sulfate, and applying the calcium sulfate saturated water under pressure to the interior of the permeable plaster mold to force such water through the pores of said mold and flush the pores of foreign matter lodged therein.

6. A method for conditioning a permeable plaster ware-forming mold for use after a period of nonuse and drying out while avoiding corrosion of the permeable plaster mold during such conditioning comprising dissolving calcium sulfate in water to be brought into contact with the permeable plaster mold to saturate such water with calcium sulfate, and immersing said mold in the calcium sulfate saturated water to moisture condition it for use on a ware-forming production press.

7. A method for conditioning a permeable plaster ware-forming mold for use after a period of nonuse and drying out while avoiding corrosion of the permeable plaster mold during such conditioning comprising dissolving calcium sulfate in water in the presence of carbon dioxide to saturate such water with calcium sulfate, and immersing said mold in the calcium sulfate saturated water to moisture condition it for use on a ware-forming production press.

References Cited in the file of this patent

J. W. Mellor: "Comprehensive Treaties on Inorganic and Theoretical Chemistry," vol. 3, pp. 777–790 (1923).